United States Patent [19]

Lefevre et al.

[11] Patent Number: 4,872,472
[45] Date of Patent: Oct. 10, 1989

[54] FLUID PRESSURE REGULATING VALVE

[75] Inventors: Jean-Claude A. Lefevre, Coye-la-Foret; Antoine T. Mauboussin, Montfermeil, both of France

[73] Assignee: Case Poclain, Le Plessis Belleville, France

[21] Appl. No.: 282,131

[22] Filed: Jul. 10, 1981

[30] Foreign Application Priority Data

Jul. 21, 1980 [FR] France ............................ 80 16040
Jun. 2, 1981 [FR] France ............................ 80 10921

[51] Int. Cl.⁴ ............................................. G05B 9/00
[52] U.S. Cl. ............................................. 137/116.3
[58] Field of Search ................................... 137/116.3

[56] References Cited

U.S. PATENT DOCUMENTS

| | | | |
|---|---|---|---|
| 2,767,726 | 10/1956 | Feucht | 137/115 |
| 2,984,251 | 5/1961 | Quinby | 137/116.3 |
| 3,174,505 | 3/1965 | Bauer | 137/505.18 |
| 3,227,172 | 1/1966 | Sims et al. | 137/116.3 |
| 3,322,150 | 5/1967 | Getman | 137/625.38 |
| 3,517,681 | 6/1970 | Davidson | 137/505.18 |
| 3,692,038 | 9/1972 | Hansen et al. | 137/116.3 |
| 3,944,099 | 3/1976 | Gohr | 414/699 |
| 4,038,999 | 8/1977 | Hayashida | 137/116.3 |
| 4,071,042 | 1/1978 | Lombard et al. | 137/116.3 |

FOREIGN PATENT DOCUMENTS

| | | |
|---|---|---|
| 1104784 | 3/1961 | Fed. Rep. of Germany . |
| 1157153 | 9/1956 | France . |
| 1562719 | 12/1966 | France . |
| 1184840 | 3/1970 | United Kingdom . |
| 1410197 | 3/1976 | United Kingdom . |
| 1517561 | 2/1979 | United Kingdom . |

Primary Examiner—Martin P. Schwadron
Attorney, Agent, or Firm—Neuman, Williams, Anderson & Olson

[57] ABSTRACT

The invention relates to a pressure-regulating valve with slide valve, comprising three decreasingly pressurized enclosures: an admission chamber, a discharge chamber and a return chamber. Said valve comprises means for creating a communication, in the intermediate position of the slide valve, between the discharge chamber and the return chamber, which means constitute a restriction whose dimensions are selected so that the fluid flowing therethrough is equal to the maximum value of the flow of fluid between the admission chamber and the discharge chamber. The present invention finds an application in the production of a stable hydraulic handling machine.

2 Claims, 6 Drawing Sheets

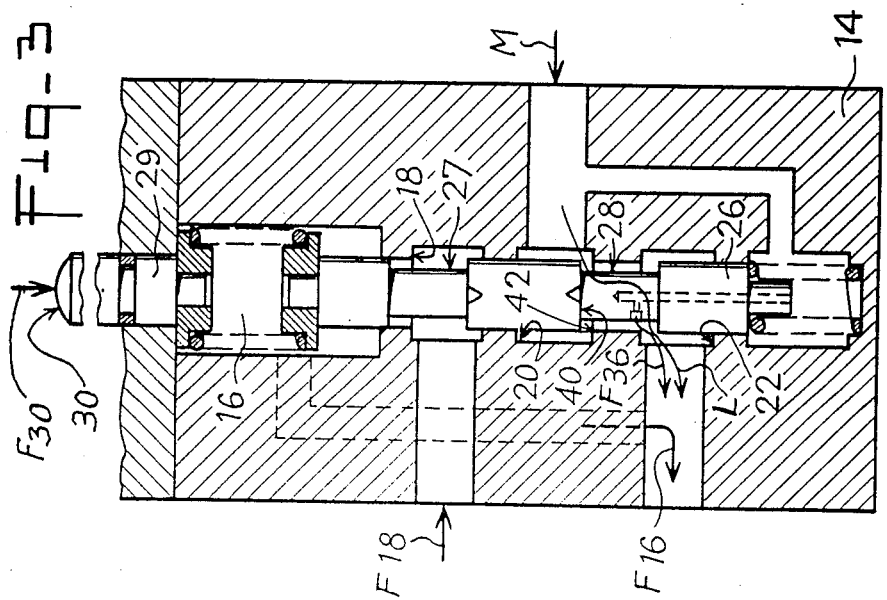
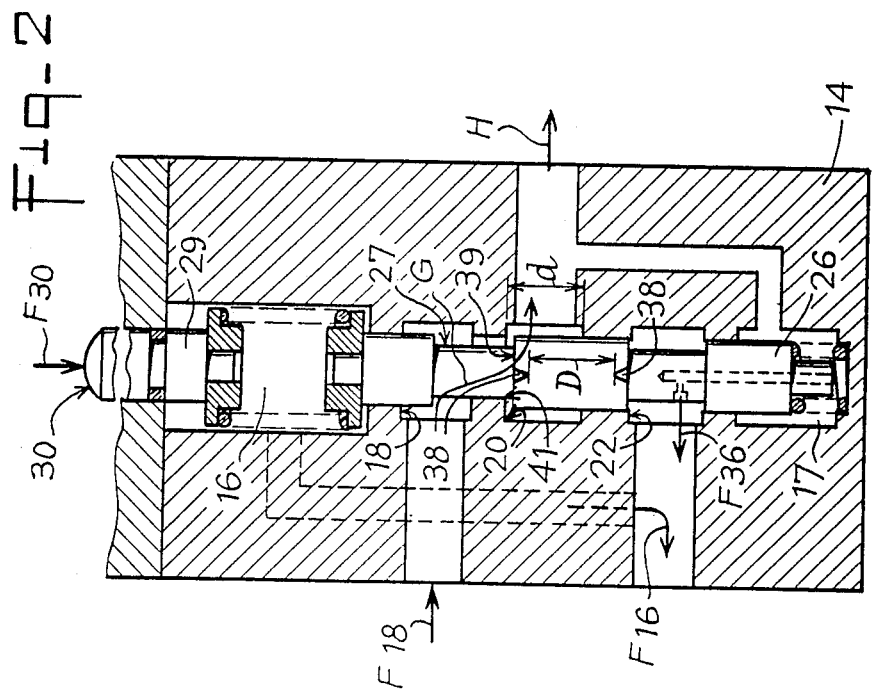

FLUID PRESSURE REGULATING VALVE

DESCRIPTION OF THE PRIOR ART

The principle of pressurized fluid manipulators is known wherein one or more fluid pressure-regulating valves are used to direct a fluid towards one or more pressure-user circuits, the pressure of which fluid should be able to vary in relation to the users' requirements.

Conventionally, a pressure regulating valve comprises the following three pressure reducing enclosures: an admission chamber for the pressurized fluid, a discharge chamber for discharging the fluid towards the pressure-using circuit concerned, and a return chamber for returning the non-utilized fluid towards a low-pressure or non-pressurized tank. When the pressure regulating member is a slide valve, generally moving axially, inevitable leaks occur between the admission and discharge chambers on the one hand, and between the discharge chamber and the return chamber on the other hand. Moreover, other secondary spurious phenomena occur and contribute to effecting the unbalancing effect of such leaks on the position of the slide valve, causing overall an undesirable instability of said slide valve, which unstability creates fluctuations in the pressure feeding the pressure-using circuit.

SUMMARY OF THE INVENTION

The main object of the invention is to overcome these disadvantages by proposing a new pressure-regulating valve, one application of which is the production of stable and accurate hydraulic handling machines.

The invention therefore relates to a fluid pressure-regulating valve working by reduction of pressure and comprised of a valve body, a pressurized fluid admission chamber which contains the fluid, before regulation, a discharge chamber for discharging a fluid whose regulated pressure is lower than the pressure prevailing in the admission chamber, a fluid return chamber for returning the fluid normally to a non-pressurized tank and for containing a fluid whose pressure is equal to or less than that of the discharge chamber, a regulating slide valve movably mounted inside a bore provided in the valve body and adapted to occupy one of three positions. The regulating slide valve is disposable to a first position in which the slide valve, on the one hand, establishes a communication between the discharge chamber and the admission chamber, an adjustable space being provided between the slide valve and the valve body, and, on the other hand, isolates the discharge chamber from the return chamber.

In its second position, the slide valve establishes a communication between the discharge chamber and the return chamber, an adjustable space being provided between the slide valve and the valve body;

In a third intermediate position the slide valve isolates the discharge chamber from the admission chamber, but does not set up the direct communication which corresponds to its second position, excepting any leaks occurring between the slide valve and the valve body.

Further a member is provided for controlling the position of the slide valve the controlling member comprises a push member, and an elastic member situated between the said push member and slide-valve.

Said fluid pressure-regulating slide valve comprises means for creating a communication, in its intermediate position, between the discharge chamber and the return chamber to provide a calibrated restriction having dimensions selected so that the flow of fluid passing therethrough is at least equal to the maximum value of the leaking flow flowing from the admission chamber towards the discharge chamber, when the slide valve is in its intermediate position.

In a preferred embodiment of this invention, the said communication means is constituted by a calibrated conduit provided in the slide valve which, in its intermediate position of the slide valve joins the discharge chamber to the return chamber.

The calibrated conduit comprises an axial section, communicating permanently with the discharge chamber, and a radial section, communicating with the return chamber in the intermediate position of the slide valve.

The axial section extends from one end of the slide valve and is closed off at that end, while remaining in permanent communication with the discharge chamber via a complementary radial section.

In the intermediate position of the slide valve, the calibrated conduit communicates with a groove provided in one of the slide valve or the valve body and with the return chamber.

In a number of special applications, the slide valve is adapted to operate with a control circuit which is both efficient and relatively inexpensive to produce.

This control circuit is--adjacent to the adopted to control the operation of a hydraulic bucket loader. In such a loader, a main engine, generally of the "Diesel'-'type, drives the hydraulic pumps which, in turn, deliver the pressurized fluid towards the receivers. When the operator of the machine stops the main engine, the loader is deprived of pressurized fluid source, and this is a problem since for example, for the boom to be able to rest on the ground under its own weight, it is necessary to move the fluid control valve supplying its steering jack and to place it in the position wherein said jack is connected with a non-pressurized tank. The position of the control valve is generally adjusted by means of small adjusting jacks coupled to the control valve and which operate only if supplied with pressurized fluid. Fluid pressure is removed, once the main engine is stopped and, therefore, there is no control for the lowering of the boom.

In order to resume the control of the position of the control valve, the loader has to be equipped with an auxiliary hand pump which, once the main engine is stopped, can deliver sufficient pressurized fluid to move the control valve supplying the boomsteering jack.

In a circuit using a valve similar to that defined hereinabove, the pump delivers the pressurized fluid into the valve which should direct the fluid towards the jack controlling the position of the fluid control valve. However, the jack and the non-pressurized tank are in permanent communication by way of the calibrated restriction provided on the valve, and the permanent communication makes it impossible to apply fluid pressure adequately to the jack controlling the position of the control valve.

This problem can be solved by providing a special pressurized fluid accumulator of a large enough volume so that, once loaded with pressurized fluid by the auxiliary hand-pump which, then, is only connected to the said fluid accumulator, the communication created between the said fluid accumulator and the jack controlling the position of the control valve, causes the latter to move, despite the fluid leaking through the calibrated restriction of the valve. This method is efficient but expensive because it necessitates the use of a special accumulator of pressurized fluid.

In a further aspect of this invention, expensive may be saved by designing the pressure regulating valve to eliminate completely the communication between the jack controlling the position of the fluid control valve and the tank through the said calibrated restriction in the position of the slide valve wherein the source of pressurized fluid communicates with the position-adjusting jack. Thus, eeven with an auxilliary pump of low capacity, it is possible to move the fluid control valve without needing any pressurized fluid accumulator.

The invention therefore also relates to a pressure regulating valve such as defined hereinabove, and wherein, in addition, the means which creates a communication, in the intermediate position of the slide valve, between the discharge chamber and the return chamber, also eliminates this communication in the first position of the slide valve.

In preferred manner, the means for creating a communication are constituted by a conduit which is provided in the slide valve and which comprises:

a first axial section which is in permanent communication with the discharge chamber, and a second, radial section which, on the one hand, communicates permanently with the axial section, and, in the intermediate position of the slide, with the return chamber, and which, on the other hand, in the first position of the slide valve, is closed off by the bore in which is mounted the slide valve.

BRIEF DESCRIPTION OF THE DRAWINGS

The invention will be more readily understood on reading the following description with reference to the accompanying drawings in which:

FIGS. 2 and 3 show the valve of FIG. 1, in two separate outermost positions of its slide valve;

DETAILED DESCRIPTION OF A PREFERRED EMBODIMENT

Figure 1:
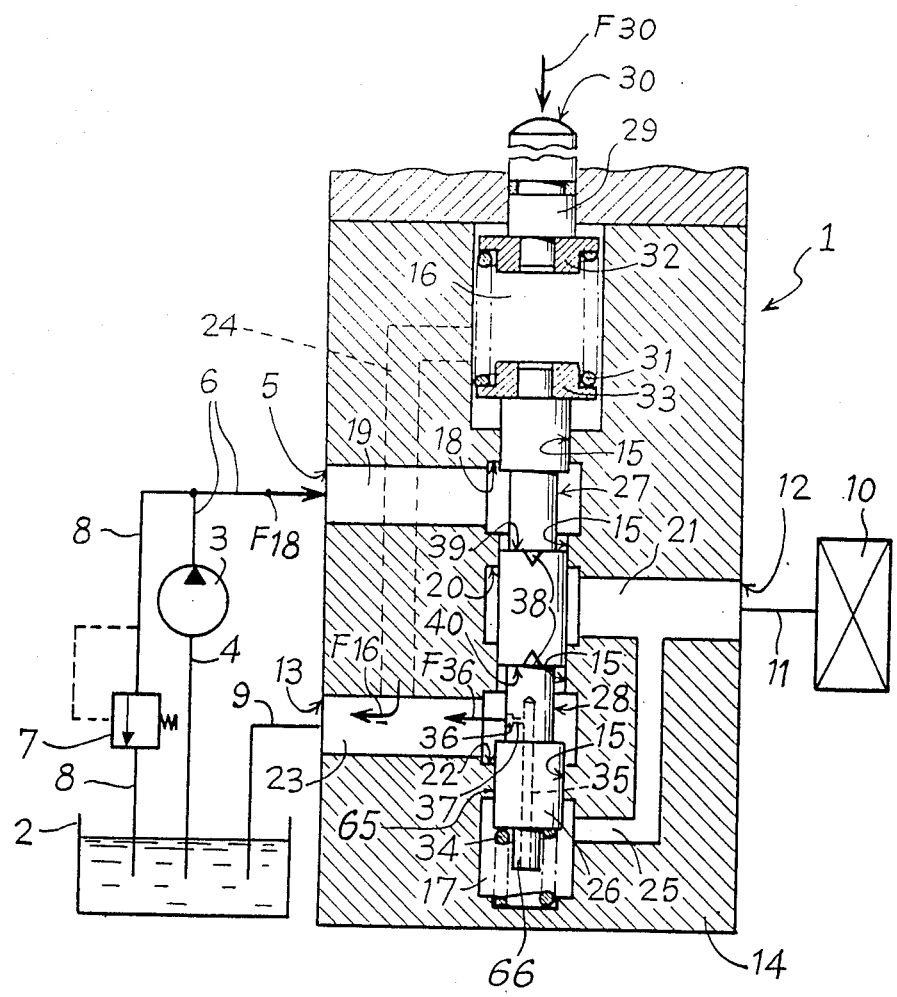
FIG. 1 is an axial cross-section of a first embodiment of a valve according to the invention, in an intermediate position of its slide valve.

The hydraulic device shown in FIG. 1 comprises
a regulation valve 1,
a non-pressurized fluid tank 2 and
a pump 3, connected via its induction pipe 4, to the tank 2, and via its delivery pipe 6, to an inlet connection 5, provided in the valve 1.

An adjustable discharge valve 7 is placed within a conduit 8 connecting the delivery pipe 6 to the tank 2.

A fluid return pipe 9 connects a pressurized fluid outlet connection 13 provided on the valve 1 for discharging fluid towards the tank 2.

A pressure-using circuit 10, connected via a conduit 11 to a fluid outlet connection of the valve for discharging the pressure regulated fluid.

Figure 5:
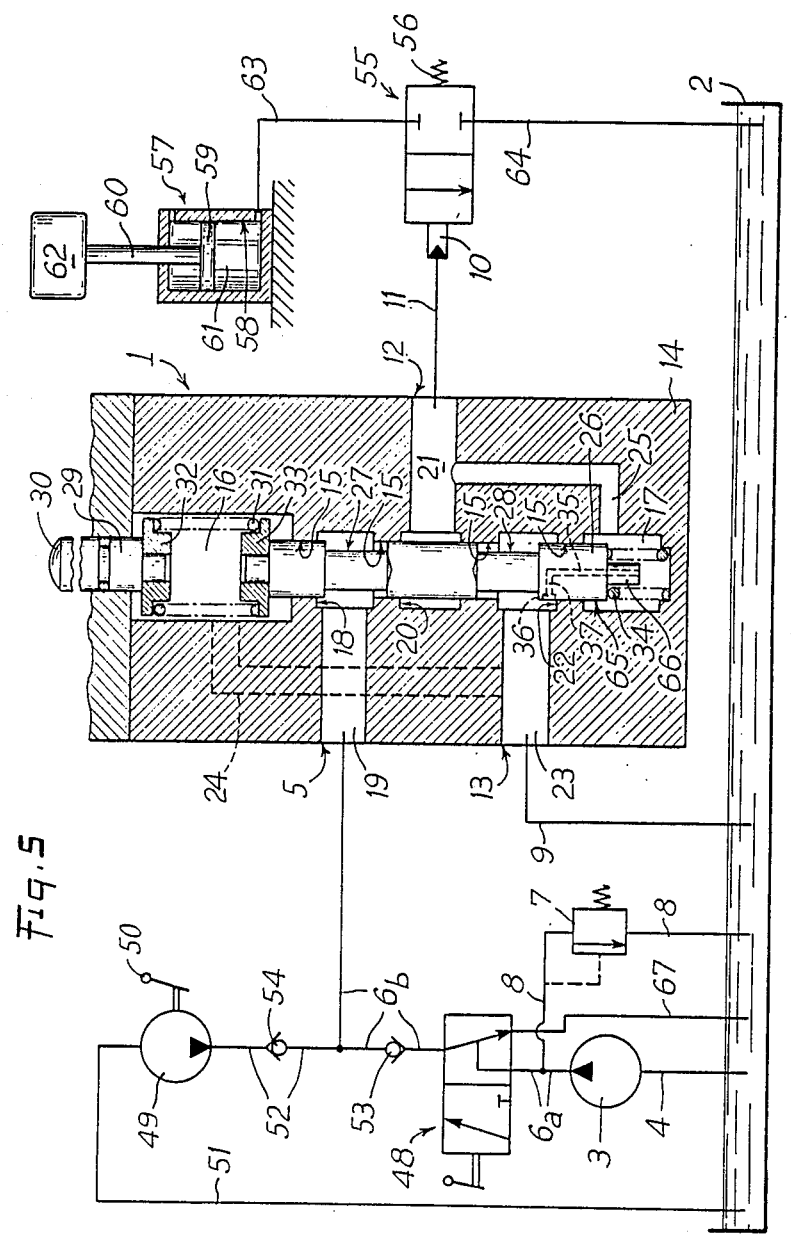
FIG. 5 shows the diagram of a circuit applying a valve according to the invention, with an axial cross-section of the valve in a first configuration of the circuit.

The hydraulic device illustrated in FIG. 5 has certain characteristics which are identical to the preceding one, and a number of other different ones.

Specifically, the device shown in FIG. 5 comprises
a regulating valve 1 and
a non-pressurized fluid tank 2,
a main pump 3 which is connected, via its induction pipe 4, to the tank 2, and via its delivery pipe 6a, to a two-position fluid control valve 48.

A conduit 6b connects the control valve 48 to an inlet connection 5 provided in the valve 1.

A non-return valve 53 is disposed within the conduit 6b and only allows the fluid to flow from the control valve 48 towards the connection 5.

An auxiliary pump 49 having a hand-operated control 50, is connected via its induction pipe 51 to the tank 2 and via its delivery conduit 52 to that part of the conduit 6b which is situated between the non-return valve 53 and the inlet connection 5.

A non-return valve 54 is disposed within a conduit 52, and only allows the fluid to flow from the auxiliary pump 49 towards the inlet connection 5.

A condut 67 connects the fluid control valve 48 to the tank 2.

An adjusted discharge valve 7 is disposed within a conduit 8 for connecting the delivery pipe 6a to the tank 2.

A fluid-returning conduit 9 connects a fluid exhaust-pipe 13, provided in the valve 1, to the tank 2.

A jack 10 adjusts the position of a two-position fluid control valve 55, and comprises the pressure-using circuit the jack 10 is connected via a conduit 11 to an exhaust-pipe 12 for receiving the fluid whose pressure has been regulated.

The control valve 55 is coupled to a spring 56 in a manner that the spring effect opposes the pressure of the fluid in the position-adjusting jack 10, and is designed to place the control valve in its second position due to the action of the spring 56.

A power jack 57, for example, is the jack controlling the steering of the boom of the hydraulic bucket loader. The jack 57 includes a coupled to a fixed structure (such as the chassis of the loader in the illustrated example), a piston 59 and a piston rod 60 coupled to the piston 59 and slidably mounted in the cylinder 58 and defining therewith a working chamber 61 for the fluid.

A mass 62 is coupled to the piston rod 60 to push any fluid which may be contained in the working chamber 61 out of said chamber (the said mass 62 being, in the illustrated example, constituted by the boom of the loader).

A conduit 63 connects the working chamber 61 to the control valve 55.

A conduit 64 connects the control valve 55 to the tank 2.

The control valve 48 has a first position to create a communication between the portion of conduit 6b situated between the non-return valve 53 and the control valve 48, the conduit 6a and the conduit 67, and a second position to create a communication between the conduits 6a and 6b and to close off the conduit 67.

The control valve 55 is disposed in a first position (FIG. 6) to create a communication between the conduits 63 and 64 when the pressurized fluid contained in the power jack 10 has the a predominant effect, and in a second position (FIG. 5) to close off the conduits 63 and 64 when the spring 56 has the predominant effect.

The construction of the valve 1 is substantially identical in the embodiments of FIGS. 1 to 3. The embodiment of the valves of FIGS. 5 and 6 differs from that shown in FIGS. 1 to 3 in the following manner.

The regulation valve 1 comprises:
a valve body 14,
a bore 15 provided inside the body 14,
and two chambers 16 and 17 each one situated at one end of the bore 15.

Three grooves are provided in the body 14, each one issuing into the bore 15 and disposed successively from the chamber 16 to the chamber 17 in the following order.

First, an inlet groove 18 is permanently connected to the admission connection 5 via a conduit 19, internal to the body 14.

Secondly, an outlet groove 20 is permanently connected to the exhaust-pipe 12 via a conduit 21, internal to the body 14.

Finally, a discharge groove 22 is permanently connected to the exhaust-pipe 13 via a conduit 23, internal to the body 14.

A conduit 24, internal to the body 14, permanently connects the chamber 16 to the conduit 23.

A conduit 25, internal to the body 14, permanently connects the conduit 21 to the chamber 17.

A slide valve 26, is mounted for sliding in the bore 15 and comprises two grooves 27 and 28 which, when the slide valve 26 occupies the position illustrated in FIG. 1 and known as intermediate position, communicate respectively with the inlet groove 18 of the body and with the discharge groove 22 of the body.

A push-member 29 is mounted for sliding inside the body 14 and coaxial to the bore 15, and comprises a pressing face 30.

A first spring 31, which is situated inside the chamber 16 between two plates 32 and, 33 and respectively mounted at the ends of the push-member 29 and of the slide valve 26.

A second spring 34, which is placed inside the chamber 17 at the other end 66 of the slide valve 26 of the body 14.

A conduit internal to the slide valve which comprises
an axial section 35 communicating with the chamber 17, and
a radial section 36 connecting the axial section 35 to the periphery of the part 65 of the slide valve 26 which slides in tight fitting manner inside the bore 15 and separating the groove 28 from the end 66 of the slide valve inside the chamber 17, and
a calibrated restriction 37 situated on the radial section 36.

With special reference to the embodiments illustrated in FIGS. 1 to 4, it should be noted that the spring 31 tends to push the slide valve 26 towards the chamber 17, whereas the spring 34, on the contrary, tends to push the slide valve 26 towards the chamber 16. In the configuration shown in FIG. 1, the slide valve 26 is balanced under the effects of these two springs and of the pressure of the fluid contained in the chamber 17. Still referring to the configuration of FIG. 1, the slide valve 26 isolates, except for the leaks between said slide valve 26 and the bore 15, the following successive chambers from each other:
the chamber 16 from the inlet groove 18,
the inlet groove 18 from the outlet groove 20,
the outlet groove 20 from the discharge groove 22, and
the discharge groove 22 from the chamber 17.

Finally, the edge 39 of the slide valve 26, selectively interrupts the communication between the grooves 18 and 20, and the edge 40 interrupts the communication between 20 and 22. As shown in FIG. 1, are provided respectively with slots of progression 38.

The pressures established in the three grooves 18, 20, 22 have decreasing illustrative values of 50 bars, 10 bars and 2 bars. It is known that the tightness achieved by a slide valve between differently pressurized chambers is poor. Therefore leaks occur between the bore 15 and the slide valve. A first leaking flow occurs from the inlet groove 18 towards the outlet groove 20, and a second leaking flow occurs from the outlet groove 20 towards the discharge groove 22.

It has been noted, up to now, that the first leaking flow was generally greater than the second, so that an excess of fluid penetrates into the outlet groove 20 causing an increase of the pressure inside the chamber 17. This pressure increase is undesirable and causes the slide valve 26 move and disturbances in the pressure of the fluid supplying the pressure-using circuit 10 (constituted for example by a jack).

In the case of the illustrated valve of this invention, these disturbances have been eliminated, due to the fact that the excess of fluid is released towards the tank 2 through the conduits 35 and 36, and the restriction 37. The overall loss of load of these two conduits and of this adjusted restriction have been precisely calculated so as to drain out the maximum leaking flow between the inlet groove 18 and the outlet groove 20, and which can be calculated in conventional manner. Therefore, in every case, the leaking flow can be drained out, thus preventing all undesirable variations of the pressure in the outlet groove 20. FIG. 1 diagrammatically shows, by way of arrows F16, F36 and F18, the leaks flowing out of the chamber 16 and the conduit 36 towards the tank 2, for the first two, and entering the inlet groove 18, for the last.

FIGS. 2 and 3 are essentially intended to show two other positions of the slide valve 26.

The first of these two other positions is that shown in FIG. 2, wherein
the force F30 applied on the face 30 of the push-member 29 is strong, and causes the slide valve 26 to be pushed in towards the chamber 17. In the first position
the slide valve 26 isolates the chamber 16 from the groove 18, and
the groove 27 of the slide valve establishes a communication between the inlet groove 18 and the outlet groove 20 of the body 14 (arrow G), via the space included between the edge 39 of the slide valve 26 and the edge 41 of the body 14 defining the groove 20. The groove 27 presents a wiredrawing restriction for the fluid, thereby causing a reduction of pressure between the inlet groove 18 and the outlet groove 20.

In the first position, the slide valve 26 isolates the outlet groove 20 from the discharge groove 22, except for the leaks, and
a flow of fluid feeds the pressure-using circuit (arrow H).

The second, other position is shown in FIG. 3, wherein the force F30 is small or nil, and, in contrast, causes a displacement of the slide valve 26 towards the chamber 16. In the second position the slide valve 26 isolates the inlet groove 18 from the chamber 16, except for the leaks, and the groove 28 of the slide valve establishes a communication between the outlet groove 20 and the discharge groove 22 (arrow L), via the space included between the edge 40 of the slide valve 26 and the other edge 42, defining the groove 20, this space also constitutes a wiredrawing restriction for the fluid, causing a progressive reduction of the pressure between the outlet groove 20 and the discharge groove 22, the fluid contained in the pressure-using circuit flowing out therefrom towards the groove 20 (arrow M).

Figure 4:
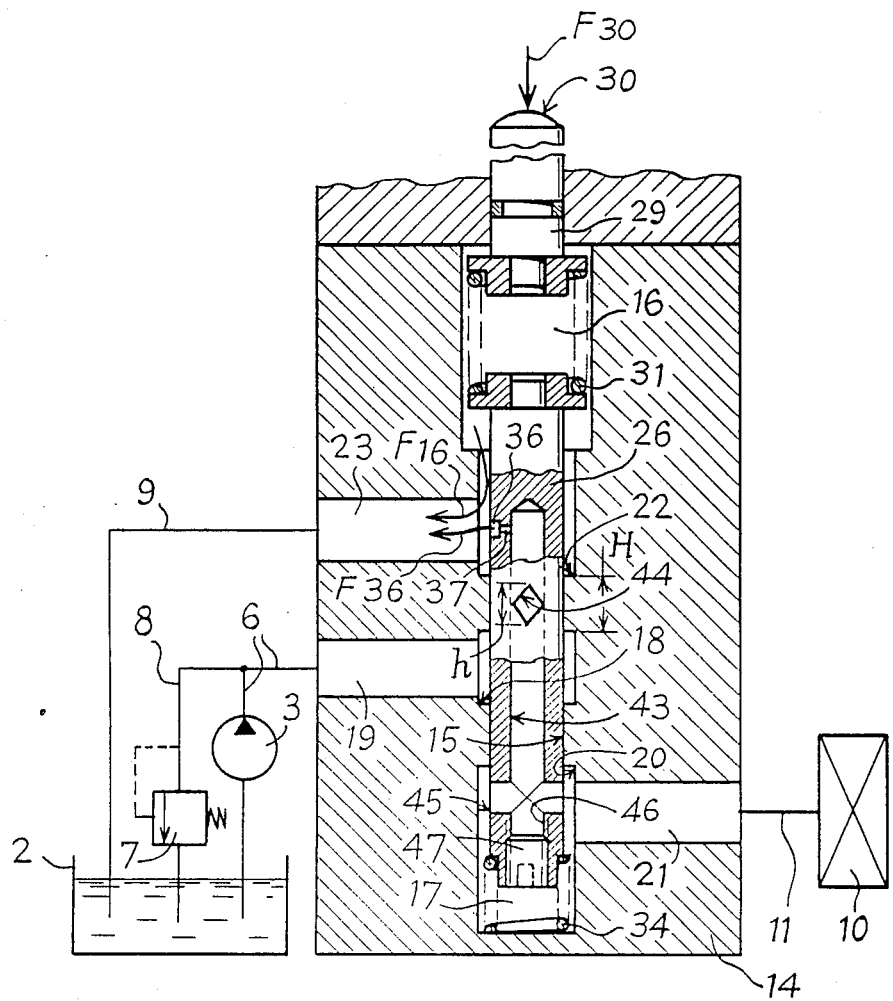
FIG. 4 is an axial cross-section of a second embodiment of a valve according to the invention.

The embodiment shown in FIG. 4 is identical, from a functional standpoint, to that shown in FIG. 1, differing therefrom by the following features.

First, the grooves provided in the body 14 are placed in the following order of succession, starting from the chamber 16: discharge groove 22, inlet groove 18, and outlet groove 20.

The slide valve 26 is entirely cylindrical and comprises no grooves. However, the slide valve 26 provided with a central conduit 43 which, via orifices 44, issues on the periphery of the slide valve 26 and, via other orifices 45, issues into the groove 20.

The orifices 44, which in the intermediate position (shown in FIG. 4) are closed off by the bore 15, communicate either with the inlet groove 18 in the first position, or with the outlet groove 22 in the second position, thus causing the pressure-using circuit 10 to communicate naturally either with the pressurized fluid supply or with the tank 2.

The radial conduit 36 opens permanently into the outlet groove 22 and is connected with the one and only axial conduit 43.

The outlet groove 22 is in permanent direct communication with the chamber 16, into which it issues, thus making it unnecessary to have to provide a conduit similar to the conduit 24.

Likewise, the exhaust groove 20 is in direct permanent communication with the chamber 17 into which it issues, thus making it unnecessary to have to provide a conduit similar to the conduit 25.

Thus, without in any way altering the functions achieved already by the embodiment shown in FIGS. 1 to 3, the embodiment shown in FIG. 4 is of a simpler structure than that of the embodiment of FIGS. 1 to 3. The following special features can also be noted. Compared with the embodiment shown in FIGS. 1 to 3, the distance d separating the edges 41 and 42 of the exhaust groove 20 is generally, and in the example illustrated, effectively less than the distance D between the opposite slots of progression 38, thus causing and accentuating the pressure fluctuations due to the leaks, because of the unequal balance pressures.

A similar phenomenon is noted in reference to the embodiment shown in FIG. 4, wherein the height H of the shoulder of the body 14 which separates the inlet groove 18 from the return groove 22, is generally greater than the overall height h of the orifices 44. The axial conduit 43 of the slide valve in FIG. 4 is drilled from one to the other end of the slide valve, the other end is thereafter provided with a thread 46 and closed off by a plug 47 screwed into the thread. Thus, the slide valve 26 no longer feels the effects of the hydrodynamical forces which tend to move it quicker than would the static pressure only, when the fluid is flowing.

Referring now to FIGS. 5 to 9, it is important to define those aspect of this embodiment of these figures that differ from the embodiments of FIGS. 1 to 4. The differences relate to the position of the orifice 68 of the radial section 36, through which said latter issues, no longer into the groove 28 but onto the periphery of the part 65 of the slide valve. The operation of these two embodiments are similar; the differences of operation due to the position of the orifice 68 will be described.

FIG. 5 shows the whole assembly, with the control valve 48 placed in its first position, the control valve 55 placed in its second position, the main pump 3 delivering fluid into the tank 2 and the auxiliary pump 49 de-actuated. In addition, the slide valve 26 of the valve 1 is in its intermediate position wherein the groove 20 is in direct communication with neither the groove 18 nor with the groove 22.

Figure 6:
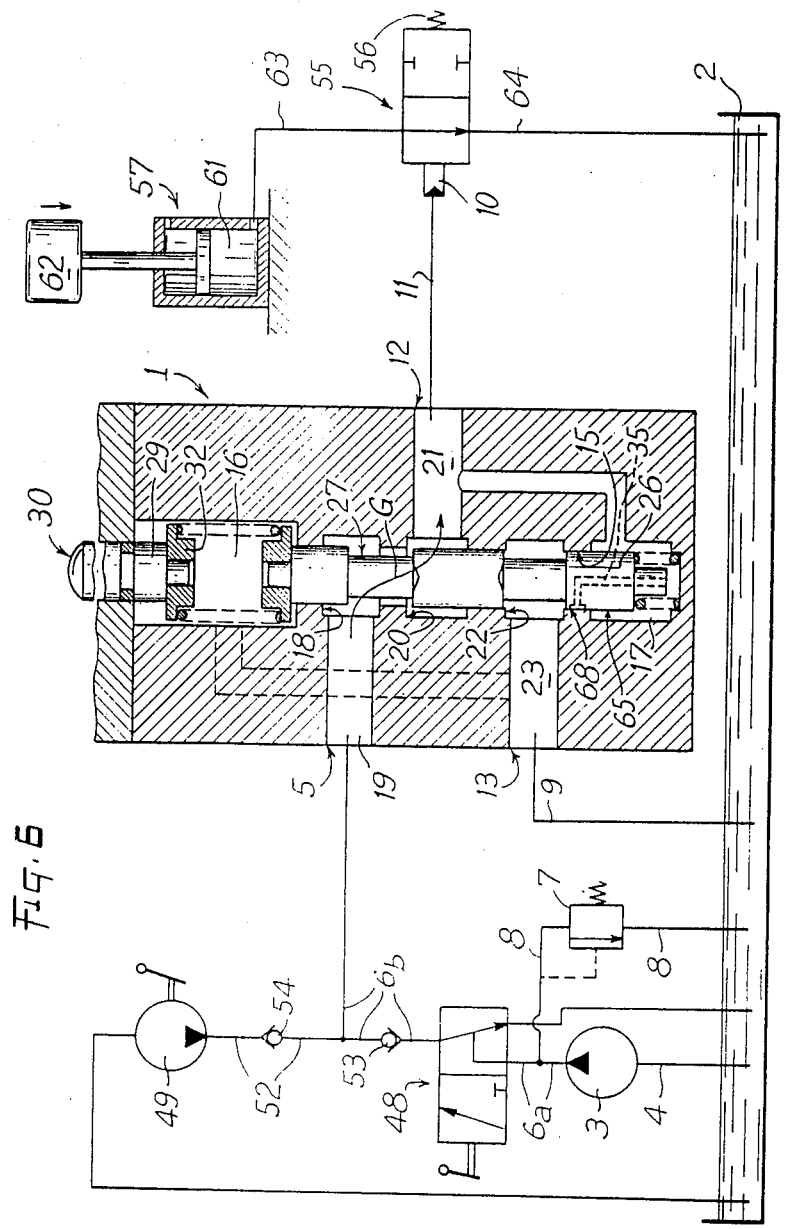
FIG. 6 is a similar view to that shown in FIG. 5, of the same circuit, but in a second configuration of the valve and of the circuit.

FIG. 6 shows the valve with the control valves 48 and 55 both in their respective first position, the main pump 3 delivering no fluid into the conduit 6b, due to the fact that it has been de-actuated i.e., its thermal drive engine having been stopped. The auxiliary pump 49 on the contrary is actuated and delivers pressurized fluid into the conduit 19 through the inlet pipe 5.

Figure 7:
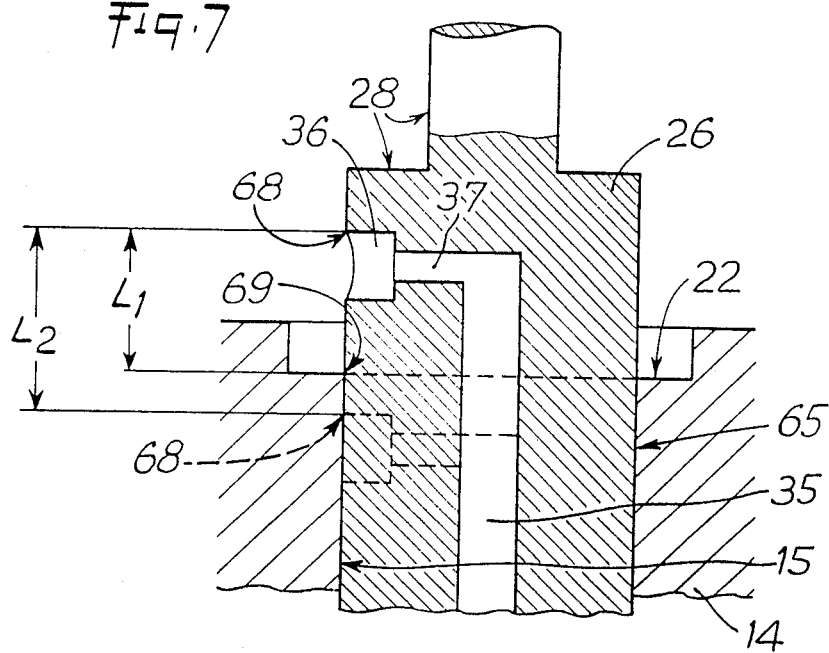
FIG. 7 is an enlarged cross-section of a detail of the valve shown in FIGS. 5 and 6.

FIG. 7 shows in block lines, the position of the slide valve 26 with respect to the groove 22, as disposed in FIG. 5, a distance $L_1$ separating the upper edge of the orifice 68 from the lower edge 69 defining the bottom of the groove 22. FIG. 7 also shows in broken lines, the position occupied by the slide valve in FIG. 6, after a displacement made possible by the valve 1 of amplitude $L_2$ greater than the distance $L_1$. In this last orientation, the conduit 36 of the slide valve 26 is closed off since the orifice 68 is itself closed off by the bore 15 of the valve body 14.

Thus, in the configuration of FIG. 6, the slide valve 26 establishes a communication (arrow G) between the conduits 19 and 21 via grooves 18, 27 and 20; and, as a result, the delivery pipe of the auxiliary pump 49 communicates with the adjusting jack 10. The groove 20 is isolated from the groove 22 by the slide valve portion interposed between the said grooves and, furthermore, the fluid leaking from the said groove 22 through the conduits 35 and 36, in the configuration of FIG. 5, is removed by disposing the bore 15 to block the orifice 68. All the fluid delivered by the auxiliary pump 49 is therefore directed towards the position-adjusting jack 10 and, regardless of the capacity of said auxiliary pump, succeeds in placing the control valve 55 in its first position. It is noted that, despite the fact that the main pump 3 is not actuated, it has been possible to establish a communication between the working chamber 61 of the jack 57 and the tank 2 via the conduits 63, 64 and the control valve 55, and to the influence of the mass 62.

It is an obvious fact that the elimination of fluid leaks in the configuration of FIG. 6, which is absolutely necessary in order to obtain the wanted result in the special application proposed for the valve 1, is equally advantageous even when, under normal operation conditions, the main pump 3 is operating (i.e. driven, the control valve 48 being placed in its second position). Indeed, the removal of the leaks makes it possible, on the one hand, to reduce the consumption of hydraulic energy by removing the loss of energy through the adjusted restriction 37, and on the other hand, to convey the entire quantity of fluid delivered by the pump 3 towards the adjusting jack 10, this decreasing the response time of the control valve 55 to effect control and correlatively increasing the manoeuvrability of the device controlled by the control valve.

Figure 8:
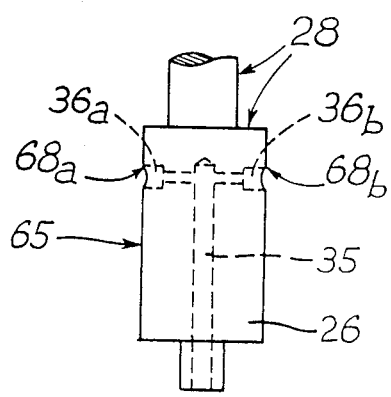
FIGS. 8 and 9 are cross-sections of variant embodiments of the slide valve in the valve shown in FIGS. 5 and 6.
Figure 9:
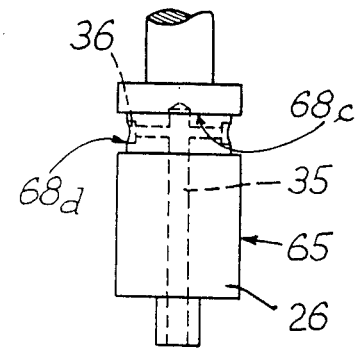

As regard design, the slide valve 26 can be of the type illustrated in FIGS. 5 to 7 or as a variant, of the type shown in FIG. 8 or of that shown in FIG. 9.

In the embodiment shown in FIG. 8, the radial conduit has been made into two diametrically opposite sections 36a and 36b issuing by their respective orifices 68a and 68b on the periphery of the part 65 of the slide valve 26. Such a slide valve 26 is particularly well balanced inside the bore 15 considering the diametrically opposite reactions of the effects of the pressure on the slide valve.

In the embodiment shown in FIG. 9, the orifice 68d of the single conduit 36 issues into a circular groove 68c provided on the periphery of the part 65 of the slide valve 26. Thereagain, the slide valve is well balanced inside the bore 15.

The design as illustrated in FIGS. 5 to 9 is also applicable to a valve such as that shown in FIG. 4.

This invention is not limited the illustrated embodiments, but on the contrary covers any variants which could be made thereto without departing from its scope or its spirit. For example, the slide valve may be rotatable instead of slidable and the fluid may be a compressed gas. Alternatively, the force F30 acting on the push member 29 may be generated directly by hand for example, or indirectly be means of an electromagnet. Finally, the loss of load of the conduits 35 and 36, or 36 and 43, and of the restriction 37 can be obtained differently, either by one or more flats provided on the periphery of the slide valve 26, or by adopting a diameter for the end of the slide valve of FIG. 1 which sinks into the chamber 17, which is smaller than the diameter of the bore 15.

What is claimed is:

1. A fluid pressure regulating valve comprising:
   (a) a valve body comprising an admission chamber for receiving fluid of a first pressure level from a source of pressurized fluid, a discharge chamber for discharging the fluid having a second pressure level to a regulated pressurized fluid using device, said second pressure level being less than said first pressure level, a fluid return chamber for receiving the fluid of a third pressure level and for returning the fluid to a non-pressurized reservoir, said third pressure level being not greater than said second pressure level, a cavity, and a bore in communication with each of said admission chamber, said return chamber and said cavity;
   (b) a regulating slide valve movably mounted within said bore to one of the following three positions:
      (1) a first position in which said slide valve establishes a first fluid path through said bore between said discharge chamber and said admission chamber, and isolates said discharge chamber from said return chamber, said slide valve and said bore defining in said first position an adjustable space therebetween as said slide valve is moved,
      (2) a second position in which said slide valve establishes a second fluid path through said bore between said discharge chamber and said return chamber, said slide valve and said bore defining in said second position an adjustable space therebetween as said slide valve is moved, and
      (3) an intermediate position in which said slide valve substantially isolates said discharge chamber from said admission chamber except for a leaking flow from said admission chamber towards said discharge chamber;
   (c) an actuatable member for disposing said slide valve towards its first position;
   (d) spring means being disposed between said actuatable member and said slide valve;
   (e) first means for defining a first communication conduit between said discharge chamber and said cavity, whereby the fluid pressure within said cavity tends to displace said slide valve in a direction from its intermediate position towards its second position; and
   (f) second means for defining a second communication conduit, in said intermediate position of said slide valve, between said cavity and said return chamber, said second communication means comprises means for forming a calibrated restriction having dimensions selected so that the flow rate of the fluid flow passing through said second communication conduit is not greater than the flow rate of said leaking flow, said second defining means unblocks, in said intermediate position of said slide value, said second communication conduit and blocks said second communication conduit in said first position of said slide valve.

2. Valve as claimed in claim 1, wherein said second communication conduit is provided in said slide valve and which comprises:
   a first axial section which is in permanent communication with said discharge chamber, and
   a second radial section which communicates permanently with said axial section, and
      in said intermediate position of said slide valve, with said return chamber,
   and, in said first position of said slide valve, is closed off by said bore.

* * * * *